United States Patent
Du et al.

(10) Patent No.: US 11,783,569 B2
(45) Date of Patent: Oct. 10, 2023

(54) METHOD FOR CLASSIFYING HYPERSPECTRAL IMAGES ON BASIS OF ADAPTIVE MULTI-SCALE FEATURE EXTRACTION MODEL

(71) Applicant: WUHAN UNIVERSITY, Hubei (CN)

(72) Inventors: Bo Du, Hubei (CN); Jiaqi Yang, Hubei (CN); Liangpei Zhang, Hubei (CN); Chen Wu, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/302,745

(22) Filed: Apr. 18, 2023

(65) Prior Publication Data

US 2023/0252761 A1 Aug. 10, 2023

Related U.S. Application Data

(63) Continuation-in-part of application No. PCT/CN2021/122341, filed on Sep. 30, 2021.

(30) Foreign Application Priority Data

Jan. 26, 2021 (CN) .......................... 202110102544.9

(51) Int. Cl.
*G06K 9/00* (2022.01)
*G06V 10/764* (2022.01)
(Continued)

(52) U.S. Cl.
CPC .......... *G06V 10/764* (2022.01); *G01J 3/2823* (2013.01); *G06V 10/25* (2022.01); *G06V 10/44* (2022.01)

(58) Field of Classification Search
CPC ........ G06N 3/045; G06N 3/084; G06N 3/044; G06N 3/04; G06N 3/08; G06N 5/046;
(Continued)

(56) References Cited

U.S. PATENT DOCUMENTS

| | | | |
|---|---|---|---|
| 2005/0089216 A1* | 4/2005 | Schiller | G06V 10/56 382/165 |
| 2020/0090369 A1 | 3/2020 | Yamaji | |
| 2020/0372361 A1* | 11/2020 | Ehteshami Bejnordi | G06N 3/084 |

FOREIGN PATENT DOCUMENTS

| | | |
|---|---|---|
| CN | 107194942 | 9/2017 |
| CN | 110321963 | 10/2019 |

(Continued)

OTHER PUBLICATIONS

Gong, A CNN with Multi-scale Convolution and Diversified Metric for Hyperspectral Image Classification, IEEE Transactions on Geoscience and Remote Sensing, vol. 57, No. 6, Jun. 2019 (Year: 2019).*

(Continued)

*Primary Examiner* — Alex Kok S Liew

(74) *Attorney, Agent, or Firm* — JCIP GLOBAL INC.

(57) ABSTRACT

Disclosed is a method for classifying hyperspectral images on the basis of an adaptive multi-scale feature extraction model, the method comprising: establishing a framework comprising the two parts of a scale reference network and a feature extraction network, introducing a condition gate mechanism into the scale reference network, performing determination step-by-step by means of three groups of modules, inputting features into a corresponding scale extraction network, deep mining rich information contained in a hyperspectral remote sensing image, effectively combining features of different scales, improving a classification effect, and generating a fine classification result map.

9 Claims, 4 Drawing Sheets

(51) Int. Cl.
*G01J 3/28* (2006.01)
*G06V 10/44* (2022.01)
*G06V 10/25* (2022.01)

(58) Field of Classification Search
CPC .......... G06N 7/01; G06N 3/048; G06N 3/088; G06N 20/00; G06N 20/10; G06N 3/047; G06N 3/086; G06N 5/022; G06V 10/764; G06V 10/82; G06V 10/454; G06V 10/763; G06V 10/7715; G06V 10/774; G06V 10/7784; G06V 10/993; G06V 10/58

See application file for complete search history.

(56) References Cited

FOREIGN PATENT DOCUMENTS

| | | |
|---|---|---|
| CN | 110598594 | 12/2019 |
| CN | 10717354 | 1/2020 |
| CN | 111126256 | 5/2020 |
| CN | 111191736 | 5/2020 |
| CN | 112766199 | 5/2021 |

OTHER PUBLICATIONS

Ramos, Deconstructing Cross-Entropy for Probabilistic Binary Classifiers, MDPI, Entropy, vol. 20, No. 3, p. 208, Mar. 2018 (Year: 2018).*

Erting Pan et al., "Gru With Spatial Prior for Hyperspectral Image Classification", Igarss 2019-2019 IEEE International Geoscience and Remote Sensing Symposium, Jul. 28-Aug. 2, 2019, pp. 967-970.

Wang Wei, "Accuracy Evaluation of Hyperspectral Image Classification Based on Light and Small UAV", Geomatics & Spatial Information Technology, vol. 43, No. 8, with English translation thereof, Aug. 2020, pp. 1-10.

Xian Li et al., "Deep Feature Fusion via Two-Stream Convolutional Neural Network for Hyperspectral Image Classification", IEEE Transactions on Geoscience and Remote Sensing, vol. 58, No. 4, Apr. 2020, pp. 2615-2629.

Di Wang et al., "Adaptive Spectral-Spatial Multiscale Contextual Feature Extraction for Hyperspectral Image Classification", IEEE Transactions On Geoscience and Remote Sensing, vol. 59, No. 3, Mar. 2021, pp. 2461-2477.

Huang Xin et al., "Classification of High Spatial Resolution Remotely Sensed Imagery Based Upon Fusion of Multiscale Features and SVM", Journal of Remote Sensng, vol. 11, No. 1, with English translation thereof, Jan. 2007, pp. 1-18.

"International Search Report (Form PCT/ISA/210) of PCT/CN2021/122341," with English translation thereof, dated Jan. 5, 2022, pp. 1-4.

"Written Opinion of the International Searching Authority (Form PCT/ISA/237) of PCT/CN2021/122341," dated Jan. 5, 2022, pp. 1-5.

"Search Report of China Application", with English translation thereof, dated Mar. 15, 2022, p. 1-p. 5.

* cited by examiner

METHOD FOR CLASSIFYING HYPERSPECTRAL IMAGES ON BASIS OF ADAPTIVE MULTI-SCALE FEATURE EXTRACTION MODEL

CROSS-REFERENCE TO RELATED APPLICATION

This is a continuation-in-part application of International Application No. PCT/CN2021/122341, filed on Sep. 30, 2021, which claims the priority benefits of China Application No. 202110102544.9, filed on Jan. 26, 2021. The entirety of each of the above-mentioned patent applications is hereby incorporated by reference herein and made a part of this specification.

BACKGROUND

Technical Field

The disclosure belongs to a technical field of image processing and relates to an image classification method, specifically to a hyperspectral image classification method based on an adaptive multi-scale feature extraction model.

Description of Related Art

Hyperspectral remote sensing is a multi-dimensional information acquisition technology that combines imaging and spectral techniques. As one of the most widely used technologies for remote sensing, hyperspectral remote sensing has shown great potential in various fields. Hyperspectral image (also referred to as hyperspectral remote sensing image) has the properties of image-spectra unity, high spectral resolution, and numerous wavebands, which can acquire almost continuous spectral feature curves of land covers and select or extract specific wavebands to highlight object features as needed. Hyperspectral image data contains rich radiometric, spatial and spectral information and is a comprehensive carrier of multiple information, which provides for the development of survey and mapping, urban planning, water conservancy and transportation, atmospheric observation, agricultural planting, geological research, environmental monitoring, and other fields. Therefore, using hyperspectral images for fine land cover identification and classification is an important foundation to realize numerous applications of hyperspectral remote sensing and earth observation technologies. Currently, there are the following challenges in hyperspectral image classification tasks:

(1) Different hyperspectral image datasets have various spatial resolutions with large differences. For example, the spatial resolution of the Pavia University dataset acquired from northern Italy is 1.3 m, while the spatial resolution of the Indiana Pines dataset acquired at the Indiana Pines Test Site in northwestern Indiana is 20 m, which is as much as 15 times different from each other. Therefore, it is important to design automatically adjustable models for different datasets to improve classification accuracy and obtain fine classification maps. Existing approaches tend to extract features from different datasets by artificially designing a fixed network without taking the heterogeneity of different data into account. In detail, a spatial prioritization method based on gated cyclic units was proposed in the literature [1], but the model designed a uniform network model for different data in modeling and failed to fully consider the information extraction errors because of the differences in spatial resolution of distinct datasets.

(2) Hyperspectral images contain rich information on land covers, while the scale of land covers varies greatly. Most of the existing methods (e.g., literature [2]) usually do not consider the scale variability of objects in the images, which makes it difficult to simultaneously extract features at different scales. The literature [3] proposed a dual-stream learning model using a convolutional neural network, however, the classification effect is still greatly limited due to the lack of multi-scale information.

Therefore, it is necessary to propose an adaptive multi-scale feature extraction method in the field of hyperspectral image classification to better realize the adaptive extraction of multi-scale land covers in different datasets, so as to meet the needs of object identification and classification.

REFERENCES

[1] E. Pan et al., "GRU with Spatial Prior for Hyperspectral Image Classification," in IGARSS 2019-2019 IEEE International Geoscience and Remote Sensing Symposium, 28 July-2 Aug. 2019 2019, pp. 967-970, doi: 10.1109/IGARSS.2019.8898566.
[2] W. Wang. Classification accuracy assessment of hyperspectral images based on light and small UAV acquisition [J]. Mapping and Spatial Geographic Information, 2020, 43 (8):161-163,167.
[3] X. Li, M. Ding, and A. Pižurica, "Deep Feature Fusion via Two-Stream Convolutional Neural Network for Hyperspectral Image Classification," IEEE Transactions on Geoscience and Remote Sensing, 2019.

SUMMARY

In order to solve the above technical problems, the present disclosure provides a hyperspectral image classification method based on an adaptive multi-scale feature extraction model.

The present disclosure provides a hyperspectral image classification method based on an adaptive multi-scale feature extraction model. A scale reference network and two feature extraction networks (large-scale feature extraction network and small-scale feature extraction network) are established, and the two networks are adaptively fused to achieve multi-scale feature extraction with an automatically adjustable model structure for different datasets. In the scale-reference network, an M groups convolutional pooling module and a conditional gating mechanism are designed. Each convolutional pooling module consists of a convolutional layer and a pooling layer, and the convolutional kernel size of the convolutional layer is 3×3. The conditional gating mechanism consists of a 1×1 convolutional layer, a batch normalization layer, a Tanh activation function layer, and an average pooling layer. The convolutional layer consists of several convolutional units, and the parameters of each convolutional unit are optimally optimized by a back-propagation algorithm. The first convolutional layer may only be able to extract some low-level features such as edges, lines, and corners, and more layers of the network can iteratively extract more complex and abstract features from low-level simple features; the specific operation of the pooling layer is basically the same as the convolutional layer, but the down-sampling convolutional kernel takes the maximum value of the corresponding position (maximum pooling), i.e., the operation law is different between matrices. Meanwhile, the pooling layer does not modify the amount used to compress the data and parameters by backpropagation, reducing overfitting in the model. The global average pooling layer means that the whole feature map is pooled on average and then the corresponding probability score for each category is obtained. When back-propagation is used to calculate the derivatives, the network parameters can be reduced to avoid the overfitting phenomenon.

After each group of convolutional pooling modules participates in the network calculation, the output from the pooling layer within that convolutional pooling module is sent to the conditional gating mechanism, which can calculate the reference value vector for scale judgment and calculate the average value of the reference value vector as the scale reference value of that convolutional pooling module.

Based on the scale reference value obtained by the scale reference network, the scale reference value is compared with the threshold value 0. If the scale reference value is greater than 0, the output features of this convolutional pooling module are sent to the small-scale feature extraction network; if the scale reference value is less than 0, the output features of this convolutional pooling module are sent to the large-scale feature extraction network.

In the large-scale feature extraction network, M groups of modules corresponding to the scale reference network are created, each of the modules includes a convolutional layer and a pooling layer, and the size of the convolutional kernel of each convolutional layer is 5×5. In the small-scale feature extraction network, M groups of modules corresponding to the scale reference network are created, each of the modules includes a convolutional layer and a pooling layer, and the size of the convolutional kernel of each convolutional layer is 3×3.

Recording $f_i^l$ as the convolutional layer function in the ith module of the lth feature extraction network (l=1 represents a small-scale feature extraction network with a convolutional kernel size of 3×3, and l=2 represents a large-scale feature extraction network with a convolutional kernel size of 5×5). $r_i^l$ is the input of the ith module in the lth feature extraction network. $W_i^l$ and $b_i^l$ are the weight matrix and bias term corresponding to the convolution layer, and the output of the ith module in the lth feature extraction network is $$l_i^l = f_i^l(W_i^l r_i^l + b_i^l) \quad (1)$$

The output of the feature extraction network can be calculated using Eq. 1. With the step-by-step adaptive selection of three modules, the framework is able to achieve automatic multi-scale feature extraction for distinct datasets.

Following the minimization of the loss function in the overall network using the Root Mean Square Propagation (RMSProp) algorithm, test samples are generated from the hyperspectral images to be classified. Moreover, the test samples are send as input to the network for acquiring land cover classification results. The RMSProp algorithm solves the problem of premature end-of-model learning to a certain extent by introducing a decay coefficient so that each decay follows a certain ratio, which is suitable for dealing with non-smooth targets.

The present disclosure provides a hyperspectral image classification method based on an adaptive multi-scale feature extraction model, specifically comprising the following steps:

Step 1: Reduce the dimensionality of the original hyperspectral image.

Step 2: For each pixel within the reduced dimensional hyperspectral image, extract an image patch centered on this pixel as a training sample.

Step 3: Initialize the network parameters of the scale reference network and the two feature extraction networks.

Step 4: Input the training samples generated based on Step 1 and Step 2 to the scale reference network.

Step 5: Calculate the reference value vector of the first convolutional pooling module via the conditional gating mechanism, and obtain the average value of the reference value vector as the scale reference value of this convolutional pooling module.

Step 6: Compare the scale reference value output from the scale reference network with the threshold value 0. If the scale reference value is greater than 0, the convolutional pooling module features are sent to the small-scale feature extraction network; if the scale reference value is less than 0, the convolutional pooling module features are sent to the large-scale feature extraction network.

Step 7: Repeat Step 5 and Step 6 to calculate the scale reference values for the second to Mth convolutional pooling modules.

Step 8: Input the training samples generated from Step 1 and Step 2 into the overall network and minimize the loss function using the RMSProp algorithm.

Step 9: Generate the test samples of hyperspectral image to be classified by Step 1 and Step 2 and input them to the overall network for the classification task.

The beneficial effects of the present disclosure are:

(1) The present disclosure designs a scale reference network, which can provide a prediction for the land cover extraction process at different scales, input multi-scale features to the corresponding feature extraction network, and carry out multi-scale feature extraction in a targeted manner.

(2) The disclosure fully considers the scale differences of different features in hyperspectral image, and proposes a multi-scale feature extraction network, which can realize the simultaneous extraction of different features at different scales in hyperspectral images and generate a finer classification map through the step-by-step cooperative learning of large-scale feature extraction network and small-scale feature extraction network, taking both the detail information and spatial information into account.

(3) The present disclosure proposes a novel adaptive multi-scale feature extraction model using a scale reference network and feature extraction network, which enables the network to learn feature fusion weights in different remote sensing scenes adaptively according to the characteristics of different datasets. Compared with existing methods that only consider single-scale feature extraction, the present disclosure not only acquires small-scale target detail information when performing feature extraction but also captures spatial information of large-scale features at the same time, thus adaptively adjusting the network structure and improving the classification effect of hyperspectral image.

Therefore, the technical solution of the present disclosure is able to process hyperspectral image data and achieve higher precision land cover recognition and classification via adaptive extraction of multi-scale features, as well as obtain clearer land cover classification maps.

DESCRIPTION OF THE EMBODIMENTS

In order to facilitate the understanding and implementation of the invention by those skilled in the art, the invention is described in further detail below in conjunction with the accompanying drawings and examples of embodiments, it is understood that the examples of embodiments described herein are for the purpose of illustrating and explaining the invention only and are not intended to limit the invention.

The method provided by the present disclosure is established to contain two parts: the scale reference network and the feature extraction network, and adaptively feeds the features into the corresponding feature extraction network according to the scale reference values of the scale reference network, so as to perform multi-scale feature adaptive extraction. In the scale reference network, considering the scale difference between various land covers of hyperspectral images, a conditional gating mechanism is used to judge the scale reference value output from the scale reference network, so as to adaptively send features into the corresponding feature extraction network. In the feature extraction network, a large-scale feature extraction network and a small-scale feature extraction network are established. The multi-scale convolutional neural network model is used to extract the multi-scale features of land covers with high accuracy. The method integrates the adaptive adjustment of network structure and multi-scale feature extraction so that the multi-scale feature information can be extracted more accurately, which can better meet the needs of high-precision feature target recognition and classification.

The embodiment of the present disclosure provides a hyperspectral image classification method based on an adaptive multi-scale feature extraction model, including the following steps:

Step 1: performing dimensionality reduction on the original hyperspectral image and retaining the first pth principal components via Principal Component Analysis (PCA).

Figure 1:
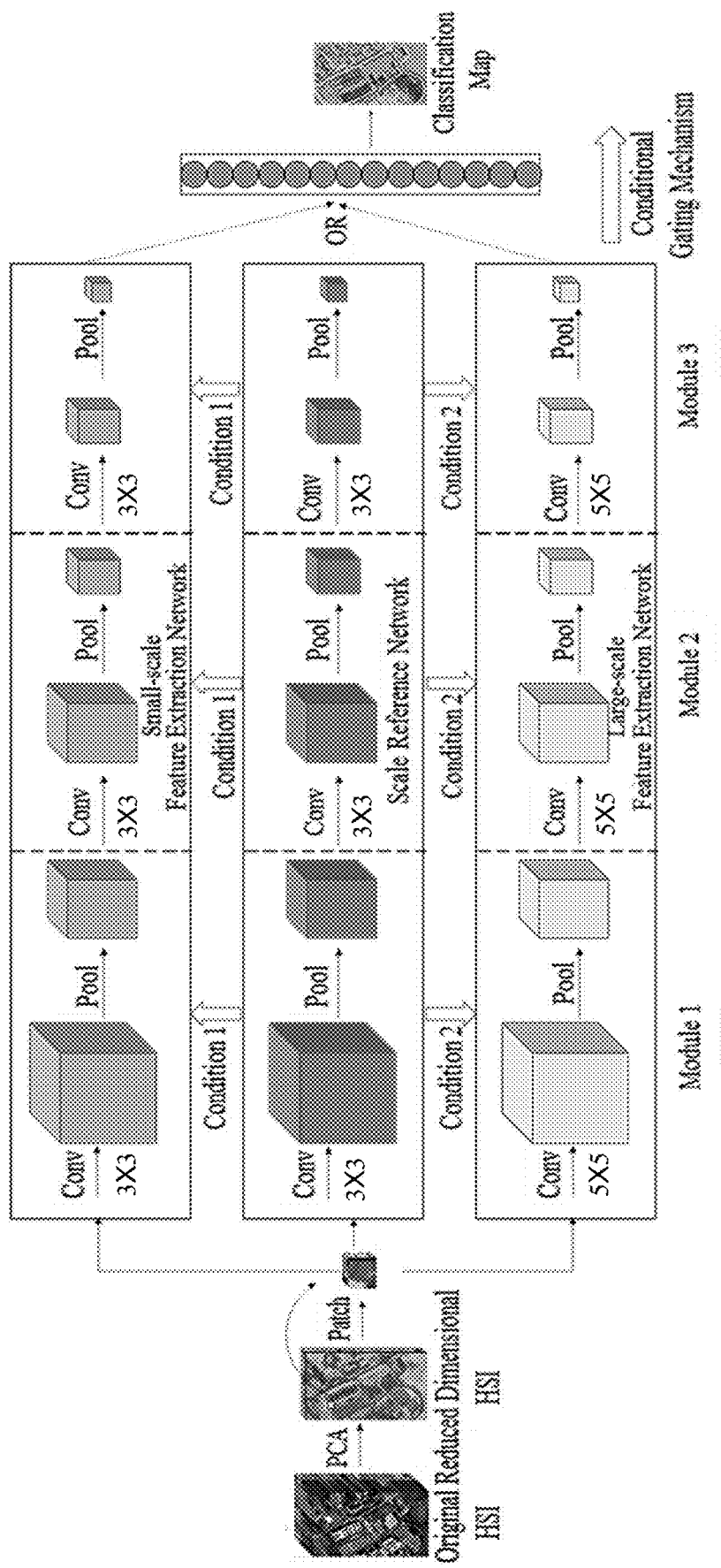
FIG. 1 is a flowchart of the adaptive multi-scale feature extraction model based on the proposed embodiment of the present disclosure.

In practice, technical persons in the field can pre-determine the value of p, and the recommended value range is 3-7. As shown in FIG. 1, the dimension of the original hyperspectral image is reduced to p by PCA. Concretely, PCA algorithm is to find some orthogonal projection directions so that the variance of the data in these projection directions is maximum. The PCA algorithm is a common method to reduce the dimensionality of data in order to convert high-dimensional data to low-dimensional with less loss of information, thus improving computational efficiency.

Preferably, the PCA dimensionality reduction process described in Step 1 includes the following steps.

Step 1.1: Record hyperspectral image as $x \in R^{m \times n}$, where m is the total number of pixels in the image, n denotes the total number of spectral bands, R represents real number field. C is the covariance matrix.

Step 1.2: The singular value decomposition of the covariance matrix C is carried out to obtain the eigenvalues of matrix C and the corresponding eigenvectors.

Step 1.3: The eigenvalues are sorted in descending order by numerical size, and the eigenvectors are also sorted in the order of the eigenvalues.

Step 1.4: Take the first p feature vectors $u_1, u_2, \ldots u_p$ after sorting in Step 1.3 to form the matrix $U=[u_1, u_2, \ldots u_p] \in R^{n \times p}$.

Step 1.5: Get a reduced dimensional hyperspectral image via $Z=XU$.

Step 2: For each pixel in the hyperspectral image after dimensionality reduction, the image patch with the size of $w \times w \times p$ is extracted with the pixel as the center. For specific implementation, the value of w can be preset, and the recommended value range of w is 9~27.

Please see FIG. 1 for pixel-by-pixel image patch extraction operation in a hyperspectral image after dimensionality reduction.

Step 3: Initialize the network parameters.

For specific implementation, the starting value of parameters can be set in the neural network as needed. Preferably, the weight matrix and bias vector parameters in the initial convolutional layer and the fully connected layer can optionally satisfy the Gaussian distribution with a mean of 0 variances of 0.1.

Step 4: Input the training samples generated based on Step 1 and Step 2 into the scale reference network as follows:

Record $x_i$ as the input of the ith convolutional pooling module (i=1, 2, 3), f is the activation function, $W_i$ and $b_i$ are the corresponding weight matrix and bias terms, and the output of the convolutional layer in the ith convolutional pooling module of scale reference network $c_i$ can be denoted as:

$$c_i = f(W_i x_i + b_i) \quad (2)$$

Based on $c_i$, the output of pooling layer $p_i$ can be calculated as:

$$p_i = \text{maxpool}(c_i) \quad (3)$$

where maxpool is the maximum pooling layer function. Through the above process, the output of each convolutional pooling module can be obtained.

As illustrated in FIG. 1, the middle branch of the network is the scale reference network, including three groups of convolutional pooling modules, each of which has a 3×3 convolutional layer and a pooling layer inside. The input data is the image patch generated by Step 1 and Step 2, and the output is the features after pooling operation.

Step 5: Use the conditional gating mechanism to calculate the first convolutional pooling module reference value vector, and calculate the average value vector as the convolution pooling module scale reference value, the specific process is:

Record $x_i$ as the input of the ith module (i=1, 2, 3), F is the convolutional layer function with the kernel size of 1×1, N denotes batch normalization function, σ represents Tanh activation function, and G is the global average pooling layer function. $W_i$ and $b_i$ are weight matrix and bias terms corresponding to the convolutional layer, then the reference value vector $g_i$ can be denoted as:

$$g_i = G(\sigma(N(F(W_i, x_i)))) + \beta_i \quad (4)$$

In addition, the reference value vector $g_i$ is utilized to further calculate the average value as the scale reference value.

Step 6: Compare the scale reference value output by the scale reference network with the threshold 0. The specific process is:

Denote condition 1 is the case where features need to be input into the small-scale feature extraction network, and condition 2 is where the features need to be input into the large-scale feature extraction network. $v_i$ is the scale reference value in the ith convolutional pooling module, and $r_i$ is the input of the ith convolutional pooling module.

$$r = condition1, \text{ if } v_i > 0; r_i = condition2, \text{ if } v_i < 0 \quad (5)$$

If the scale reference value is greater than 0, the module features are sent to the small-scale feature extraction network. If the scale reference value is less than 0, the module features are fed into the large-scale feature extraction network.

Step 7: Repeat Step 5 and Step 6, and calculate the second convolutional pooling module and the third convolutional pooling module scale reference values in turn.

Step 8: Input the training samples generated based on Step 2 and Step 3 into the overall network, and use the RMSProp algorithm to minimize the loss function.

As displayed in FIG. 1, the overall network consists of a scale reference network and two feature extraction networks. Each network includes three groups of modules, each module has a convolutional layer and a pooling layer inside, the convolution kernel size of the convolutional layer of the scale reference network of the middle branch and the small-scale feature extraction network of the upper branch is 3×3, and the convolution kernel size of the convolution layer of the large-scale feature extraction network of the lower branch is 5×5. The input data is the image patch generated in Step 1 and Step 2, and the output is multi-scale features. In detail, three groups of modules are connected sequentially, the output features of the last module are straightened and input to 128 nodes fully connected layer, and then the land cover category information is output.

The loss function of the overall network is:

$$L = -\frac{1}{n}[y_i \log(\hat{y}_i) + (1 - y_i)\log(1 - \hat{y}_i)] \quad (6)$$

where n is the number of training samples, $y_i$ is the true class corresponding to sample i, and $\hat{y}_i$ represents the corresponding prediction class of sample i.

Step 9: For the hyperspectral image to be classified, use Step 1 and Step 2 to generate test samples, and input them into the network to complete land cover classification task and generate land cover classification maps.

Figure 2:
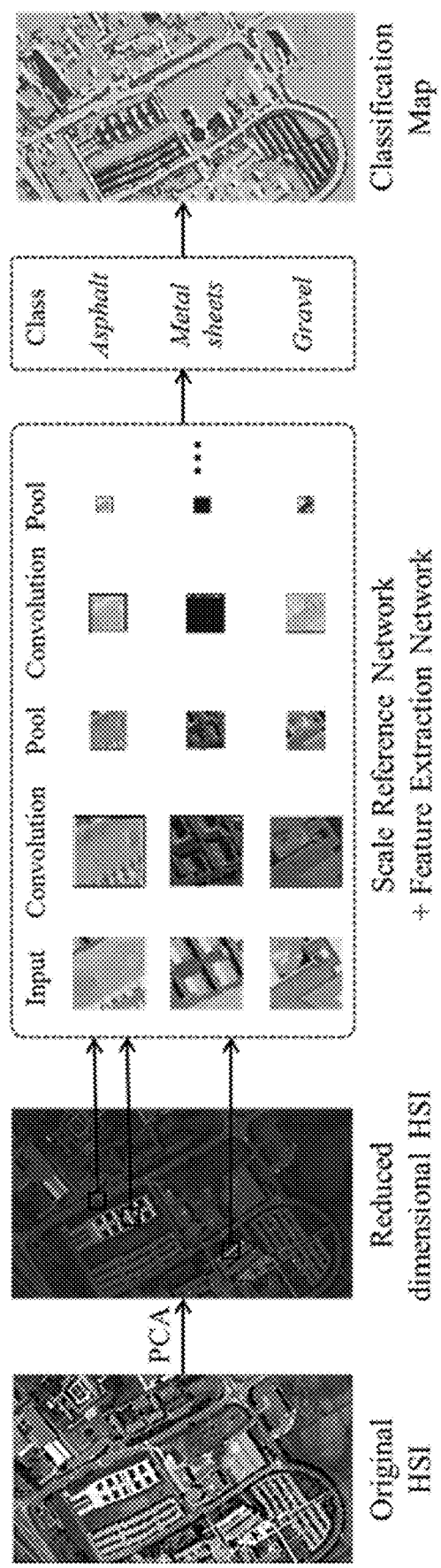
FIG. 2 is a schematic diagram of generating the classification map from the hyperspectral image in the Pavia University scene according to the embodiment of the present disclosure.

As shown in FIG. 2, the hyperspectral image was acquired by the ROSIS sensor at Pavia University in 2001. After removing 12 bands covering the noise and water absorption regions, data for 103 bands with a spectral range from 0.43 to 0.86 microns was retained. The image has a size of 610×340 pixels and has a spatial resolution of 1.3 meters, and contains 9 categories of land cover types. PCA dimensionality reduction is applied to the original hyperspectral remote sensing image to obtain the reduced dimensional data. In the dimensionality reduction data, the image patch with the size of w×w×p (recommended value of w is within the range of 9~27) is extracted based on each pixel as the center (in order to better explain the patent, part image patches are selected to present the flow) as input data. The input data is fed into the convolutional layer and pooling layer module of the initialized scale reference network and feature extraction network for layer-by-layer feature extraction to obtain the abstract features after convolution or pooling. On the basis of the above abstract features, the category of the central pixel of each input image patch can be obtained, and the classification map of 9 types of land covers in Pavia University can be obtained after traversing each pixel in the image (each color represents a type of land cover).

Figure 3:
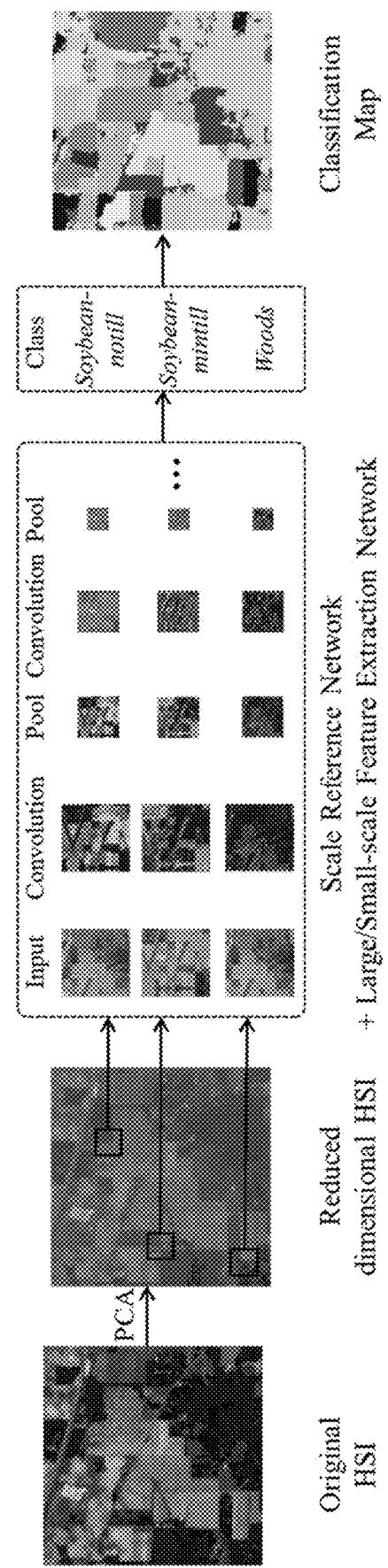
FIG. 3 is a schematic diagram of generating the classification map from the hyperspectral image in the Indian Pines scene according to the embodiment of the present disclosure.

As shown in FIG. 3, the hyperspectral image was gained in 1992 by the AVIRIS sensor in Northwestern Indiana After removing 20 bands covering the noise and water absorption regions, data for 200 bands with a spectral range from 0.4 to 2.5 microns was retained. The image has a size of 145×145 pixels and has a spatial resolution of 20 meters, and contains 16 categories of land cover types. PCA dimensionality reduction is applied to the original hyperspectral remote sensing image to obtain the reduced dimensional data. In the dimensionality reduction data, the image patch with the size of w×w×p (recommended value of w is within the range of 9~27) is extracted based on each pixel as the center (in order to better explain the patent, part image patches are selected to present the flow) as input data. The input data is fed into the convolutional layer and pooling layer module of the initialized scale reference network and feature extraction network for layer-by-layer feature extraction to obtain the abstract features after convolution or pooling. On the basis of the above abstract features, the category of the central pixel of each input image patch can be obtained, and the classification map of 9 types of land covers in Pavia University can be obtained after traversing each pixel in the image (each color represents a type of land cover).

Figure 4:
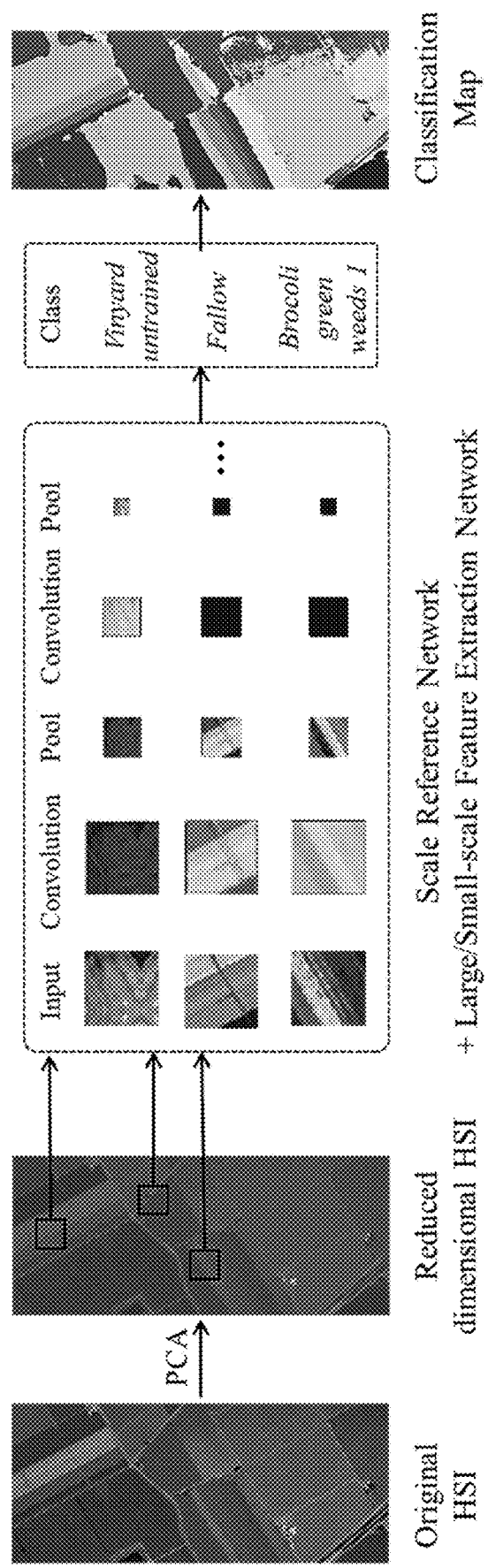
FIG. 4 is a schematic diagram of generating the classification map from the hyperspectral image in the Salinas Valley scene according to the embodiment of the present disclosure.

As shown in FIG. 4, the hyperspectral image was collected by the AVIRIS sensor over Salinas Valley, California After removing 20 bands covering the noise and water absorption regions, data for 204 bands with a spectral range from 0.4 to 2.5 microns was retained. The image has a size of 512×217 pixels and has a spatial resolution of 3.7 meters, and contains 16 categories of land cover types. PCA dimensionality reduction is applied to the original hyperspectral remote sensing image to obtain the reduced dimensional data. In the dimensionality reduction data, the image patch with the size of w×w×p (recommended value of w is within the range of 9~27) is extracted based on each pixel as the center (in order to better explain the patent, part image patches are selected to present the flow) as input data. The input data is fed into the convolutional layer and pooling layer module of the initialized scale reference network and feature extraction network for layer-by-layer feature extraction to obtain the abstract features after convolution or pooling. On the basis of the above abstract features, the category of the central pixel of each input image patch can be obtained, and the classification map of 9 types of land covers in Pavia University can be obtained after traversing each pixel in the image (each color represents a type of land cover).

Experimental results in different scenes show that the three groups of convolutional pooling modules and the corresponding multi-scale feature extraction modules designed in embodiments of the present disclosure can accurately classify land covers covered by hyperspectral images, generate fine classification maps, and provide high-quality land cover classification result data for urban planning, resource exploration, and land use.

The above is the implementation steps of a hyperspectral image classification method to which the present disclosure relates. The overall network comprehensively considers the heterogeneity of hyperspectral image and the difference in feature scale. Accordingly, the adaptive extraction of multi-scale land covers for different scenes can be realized via scale reference network and feature extraction network, meanwhile fine land cover classification maps can be yielded. In a specific embodiment, the NVIDIA GeForce RTX 3090Ti GPU hardware acceleration computing or a software automatic execution may be used to generate the land cover classification map of the hyperspectral image, and the device running the process should also be within the scope of protection of the present invention.

Due to the difference in data acquisition equipment, the pixel values of collected hyperspectral images often vary greatly, which may affect the classification performance. To avoid this problem, before proceeding to Step 1, the hyperspectral image data may be normalized or standardized, which means that the data is scaled so that all data values fall into a small specific interval, where all pixel values are uniformly mapped to the [0,1] interval, so as to improve the model convergence speed and let each feature contribute the same to the result. The above step will be referred to as a preprocessing step in the present invention.

It should be understood that the parts not elaborated in this specification are prior technology.

It should be understood that the above descriptions of the better embodiment is more detailed, and cannot be regarded as a limitation of the scope of invention patent protection, ordinary skilled in the art under the inspiration of the invention, without departing from the scope of the claims of the invention, may also make alterations or variations, all fall within the scope of invention protection, the scope of protection of the invention shall be subject to the attached claims.

What is claimed is:

1. A hyperspectral image classification method based on an adaptive multi-scale feature extraction model comprising: establishing an overall network of a scale reference network and two feature extraction networks comprising two types of network models comprising a large-scale feature extraction network and a small-scale feature extraction network, and performing an adaptive fusion of the two types of network models to realize a multi-scale feature extraction that automatically adjusts a model structure for different scenes;

in the scale reference network, M groups of convolutional pooling modules and a conditional gating mechanism are proposed, and after each group of the convolutional pooling modules participates in a network operation, sending characteristics output by a pooling layer in the convolutional pooling modules to the conditional gating mechanism, and calculating, by the conditional gating mechanism, a reference value vector for scale judgment, and calculating a reference value vector average value as a convolutional pooling module scale reference value;

the following steps are comprised:

step 1: reducing a dimensionality of an original hyperspectral remote sensing image;

step 2: for each pixel within a reduced dimensional hyperspectral image, extracting an image patch centered on the pixel as a training sample;

step 3: initializing network parameters of the scale reference network and the two feature extraction networks;

step 4: inputting the training sample generated based on the step 1 and the step 2 to the scale reference network;

step 5: calculating a reference value vector of a first convolutional pooling module via the conditional gating mechanism, and calculating an average value of the reference value vector as the convolutional pooling module scale reference value;

step 6: comparing a scale reference value output from the scale reference network with a threshold value being 0, if the scale reference value is greater than 0, sending the convolutional pooling module features to the small-scale feature extraction network; if the scale reference value is less than 0, sending the convolutional pooling module features to the large-scale feature extraction network;

step 7: repeating the step 5 and the step 6 to calculate scale reference values for a second to Mth convolutional pooling modules;

step 8: inputting the training sample generated from the step 1 and the step 2 into the overall network and minimize a loss function using a Root Mean Square Propagation algorithm;

step 9: generating, by using the step 1 and the step 2, test samples of a hyperspectral image to be classified and inputting the test samples to the overall network for a classification task.

2. The hyperspectral image classification method based on an adaptive multi-scale feature extraction model according to claim 1, wherein: in step 1, a Principal Component Analysis algorithm is used to reduce the dimensionality of the original hyperspectral remote sensing image, and a dimensionality reduction process comprises the following steps:

step 1.1: recording the hyperspectral remote sensing image as $X \in R^{m \times n}$, where m is a total number of image pixels, n is a total number of spectral bands, R represents real number field, calculating image X covariance matrix C;

step 1.2: performing a singular value decomposition of the covariance matrix C to obtain matrix C eigenvalues and a corresponding eigenvectors;

step 1.3: sorting the eigenvalues in descending order by numerical size, and correspondingly sorting the eigenvectors based on an order of the eigenvalues;

step 1.4: taking the first p feature vectors $u_1, u_2, \ldots u_p$ after the sorting in the step 1.3 to form a matrix $U = [u_1, u_2, \ldots u_p] \in R^{m \times p}$;

step 1.5: obtaining a reduced dimensional image by using an equation of $Z = XU$.

3. The hyperspectral image classification method based on an adaptive multi-scale feature extraction model according to claim 1, wherein: each group of the convolutional pooling modules is composed of a convolutional layer and a pooling layer, the convolutional layer convolution kernel size is 3×3, the conditional gating mechanism is composed of a 1×1 convolutional layer, a batch normalization layer, a Tanh activation function layer and an average pooling layer.

4. The hyperspectral image classification method based on an adaptive multi-scale feature extraction model according to claim 1, wherein: in the large-scale feature extraction network, M groups of modules corresponding to the scale reference network are established, each module comprises a convolutional layer and a pooling layer, a convolutional kernel size of the convolutional layer is 5×5; in the small-scale feature extraction network, M groups of modules corresponding to the scale reference network is established, each module includes a convolutional layer and a pooling layer, a convolutional kernel size of the convolutional layer is 3×3.

5. The hyperspectral image classification method based on an adaptive multi-scale feature extraction model according to claim 1, wherein: a specific calculation process of an output of the feature extraction network is as follows:

recording $f_i^l$ as a convolutional layer function in a lth module of a lth feature extraction network, l=1 represents a small-scale feature extraction network with a convolutional kernel size of 3×3, l=2 represents a large-scale feature extraction network with a convolutional kernel size of 5×5, $r_i^l$ is an input of the lth module in the lth feature extraction network, $W_i^l$ and $b_i^l$ are a weight matrix and a bias term corresponding to the convolutional layer, and an output of the ith module in the lth feature extraction network is:

$$t_i^l = f_i^l(W_i^l r_i^l + b_i^l) \quad (1)$$

the output of the feature extraction network is calculated by equation 1, and the multi-scale feature extraction can be realized for different datasets through a step-by-step adaptive selection of the M group of modules.

6. The hyperspectral image classification method based on an adaptive multi-scale feature extraction model according to claim 1, wherein: a specific process of the scale reference value is:

recording an input of an ith module as $x_i$, F is a convolutional layer function with a convolutional kernel size of 1×1, N is a batch normalization function, σ represents a Tanh activation function, G is a global average pooling layer function, $W_i$ and $β_i$ are a weight matrix and a bias term corresponding to the convolutional layer, and a reference value vector $g_i$ is:

$$g_i = G(\sigma(N(F(W_i, x_i)))) + \beta_i \quad (4)$$

the reference value vector $g_i$ is used to further calculate an average value as the scale reference value.

7. The hyperspectral image classification method based on an adaptive multi-scale feature extraction model according to claim 1, wherein: an overall network loss function is:

$$L = -\frac{1}{n}[y_i \log(\hat{y}_i) + (1 - y_i)\log(1 - \hat{y}_i)] \quad (6)$$

wherein n is a number of the training sample, $y_i$ is a true class corresponding to a sample i, $\hat{y}_i$ represents a prediction class corresponding to the sample i.

8. The hyperspectral image classification method based on an adaptive multi-scale feature extraction model according to claim 1, further comprising: performing a standardized processing on hyperspectral image data before the reduction of the dimensionality is performed on the original hyperspectral remote sensing image.

9. The hyperspectral image classification method based on an adaptive multi-scale feature extraction model according to claim 1, wherein a hyperspectral image land cover classification map is generated by using a NVIDIA GeForce RTX 3090Ti GPU hardware acceleration computing.

* * * * *